United States Patent
Bolukbas et al.

(10) Patent No.: US 11,886,598 B2
(45) Date of Patent: *Jan. 30, 2024

(54) SYSTEM AND METHOD FOR SCALABLE CYBER-RISK ASSESSMENT OF COMPUTER SYSTEMS

(71) Applicant: NormShield, Inc., Vienna, VA (US)

(72) Inventors: Candan Bolukbas, Stone Ridge, VA (US); Robert Maley, Chandler, AZ (US); Ferhat Dikbiyik, Sakarya (TR)

(73) Assignee: NormShield, Inc., Vienna, VA (US)

( * ) Notice: Subject to any disclaimer, the term of this patent is extended or adjusted under 35 U.S.C. 154(b) by 153 days.

This patent is subject to a terminal disclaimer.

(21) Appl. No.: 17/174,307

(22) Filed: Feb. 11, 2021

(65) Prior Publication Data

US 2021/0334387 A1    Oct. 28, 2021

Related U.S. Application Data

(63) Continuation of application No. 16/855,282, filed on Apr. 22, 2020, now Pat. No. 10,949,543.

(51) Int. Cl.
G06F 21/00    (2013.01)
G06F 21/57    (2013.01)

(52) U.S. Cl.
CPC ...... *G06F 21/577* (2013.01); *G06F 2221/034* (2013.01)

(58) Field of Classification Search
CPC .................. G06F 21/577; G06F 2221/034
See application file for complete search history.

(56) References Cited

U.S. PATENT DOCUMENTS 9,294,498 B1 *  3/2016  Yampolskiy ........ H04L 61/5076
9,830,569 B2   11/2017  Dahlberg
(Continued)

FOREIGN PATENT DOCUMENTS

WO    2018/216000 A1    11/2018
WO    2019/051507 A1    3/2019
(Continued)

OTHER PUBLICATIONS

Cyber Threat Susceptibility Assessment; https://www.mitre.org/publications/systems-engineering-guide/enterprise-engineering/systems-engineering-for-mission-assurance/cyber-threat-susceptibility-assessment, The Mitre Corporation, retrieved Apr. 22, 2020.
(Continued)

*Primary Examiner* — Tri M Tran
(74) *Attorney, Agent, or Firm* — Rauschenbach Patent Law Group, PLLC; Kurt Rauschenbach

(57) ABSTRACT

A method of cyber risk assessment includes receiving request for a quantitative cyber risk assessment from an entity associated with a domain name. Entity information is non-intrusively gathered from a plurality of data sources about the entity based on the domain name. A digital footprint of the entity is discovered based the associated domain name using non-intrusive information gathering. At least one characteristic of the entity is classified to determine an entity classification and at least one entity risk quantification parameter. At least one control item is fetched from the knowledge database. An entity technical finding is determined based on the fetched at least one control item and based on the discovered digital footprint. At least one industry-related quantification parameter is fetched based on the entity technical finding and based on the entity classification. A quantitative risk value is calculated from a determination of loss frequency and loss magnitude.

20 Claims, 9 Drawing Sheets

(56) References Cited

U.S. PATENT DOCUMENTS

| | | | |
|---|---|---|---|
| 9,973,524 | B2 | 5/2018 | Boyer et al. |
| 10,257,219 | B1 | 4/2019 | Geil et al. |
| 10,268,976 | B2 | 4/2019 | Rasumov |
| 10,425,380 | B2 | 9/2019 | Geil et al. |
| 10,438,001 | B1 | 10/2019 | Hariprasad |
| 10,546,135 | B1 | 1/2020 | Kassoumeh et al. |
| 10,949,543 | B1 | 3/2021 | Bolukbas et al. |
| 10,951,658 | B2 | 3/2021 | Putz et al. |
| 10,963,572 | B2 | 3/2021 | Belfiore, Jr. et al. |
| 10,984,112 | B2 | 4/2021 | Agarwal |
| 10,986,117 | B1 | 4/2021 | Agbabian et al. |
| 2005/0066195 | A1 | 3/2005 | Jones |
| 2011/0252479 | A1 | 10/2011 | Beresnevichiene et al. |
| 2017/0187745 | A1 | 6/2017 | Ng et al. |
| 2017/0346846 | A1* | 11/2017 | Findlay ............... H04L 63/1433 |
| 2018/0115577 | A1 | 4/2018 | Shukla et al. |
| 2018/0146004 | A1 | 5/2018 | Belfiore, Jr. et al. |
| 2018/0181761 | A1 | 6/2018 | Sinha et al. |
| 2018/0351976 | A1 | 12/2018 | Shitrit-efergan et al. |
| 2019/0034845 | A1 | 1/2019 | Mo et al. |
| 2019/0182289 | A1 | 6/2019 | White |
| 2019/0207981 | A1 | 7/2019 | Sweeney et al. |
| 2019/0364073 | A1 | 11/2019 | Jones |
| 2020/0090197 | A1 | 3/2020 | Rodriguez et al. |
| 2020/0162485 | A1 | 5/2020 | Jevans et al. |
| 2020/0204574 | A1 | 6/2020 | Christian |
| 2020/0404012 | A1 | 12/2020 | Pichetti et al. |
| 2021/0075814 | A1 | 3/2021 | Bulut et al. |
| 2021/0099477 | A1 | 4/2021 | Hunt |
| 2021/0110319 | A1* | 4/2021 | Gourisetti .......... G06Q 10/0637 |
| 2021/0216630 | A1 | 7/2021 | Karr |
| 2022/0050896 | A1 | 2/2022 | Ahmed |

FOREIGN PATENT DOCUMENTS

| | | | | |
|---|---|---|---|---|
| WO | 2019144039 | A1 | 7/2019 | |
| WO | WO-2019144039 | A1 * | 7/2019 | ........... G06F 16/986 |
| WO | 2021/216307 | A1 | 10/2021 | |

OTHER PUBLICATIONS https://attack.mitre.org, retrieved Apr. 22, 2020.
Sarfone, et al., Technical Guide to Information Security Testing and Assessment, Sep. 2008, 80 pages, National Institute of Standards and Technology, U.S. Department of Commerce, Special Publication 800-115.
Non-Final Office Action received for U.S. Appl. No. 17/229,024 dated Jun. 16, 2021, 36 pages.
Non Final Office Action received for U.S. Appl. No. 16/855,282 dated Jun. 18, 2020, 30 pages.
Notice of Allowance received for U.S. Appl. No. 16/855,282 dated Nov. 18, 2020, 28 pages.
Ex Parte Quayle Action received for U.S. Appl. No. 17/476,210 dated Apr. 6, 2022, 105 pages.
Notice of Allowance received for U.S. Appl. No. 17/476,210 dated Jun. 13, 2022, 93 pages.
"Notification of Transmittal of the International Search Report and The Written Opinion of the International Searching Authority, or the Declaration" for PCT/US2021/026751, 12 pages, the ISA/KR, Korean Intellectual Property Office, Republic of Korea.
Notice of Allowance received for U.S. Appl. No. 17/476,210 dated Jul. 21, 2022, 9 pages.
Office Action received in corresponding Chinese Patent Application No. 202180030129.5, dated Feb. 25, 2023, 12 pages including 6 pages of English Translation.
Examiner Report Received in Canadian Patent Application No. 3179196, dated Jan. 24, 2022, 4 pages.
International Preliminary Report on Patentability, Chapter 1 of the Patent Cooperation Treaty, Received in PCT Application No. PCT/US2021/026751 dated Nov. 3, 2022, 7 pages.
Examiner Report Received in Canadian Patent Application No. 3179196, dated Jan. 24, 2023, 4 pages.
Examiner Report Received in corresponding Canadian Patent Application No. 3179196, dated Nov. 2, 2023, 4 pages.

* cited by examiner

| COMPANY | ECOSYSTEM(S) | INDUSTRY | COUNTRY | GRADE | CYBER RATING | FINANCIAL IMPACT |
|---|---|---|---|---|---|---|
| [LOGO] <NAME OF ENTITY A> <DOMAIN NAME OF ENTITY A> | ECOSYSTEM X | INDUSTRY 1 | FLAG | 82 0 PERCENT 100 | B- | $212.3K |
| [LOGO] <NAME OF ENTITY B> <DOMAIN NAME OF ENTITY B> | ECOSYSTEM X | INDUSTRY 2 | FLAG | 78 0 PERCENT 100 | C+ | $198.5K |
| [LOGO] <NAME OF ENTITY A> <DOMAIN NAME OF ENTITY B> | ECOSYSTEM Y | INDUSTRY 1 | FLAG | 49 0 PERCENT 100 | D | $357.9K |

FIG. 9

SYSTEM AND METHOD FOR SCALABLE CYBER-RISK ASSESSMENT OF COMPUTER SYSTEMS

RELATED APPLICATION SECTION

This present application is a continuation of U.S. patent application Ser. No. 16/855,282, filed on Apr. 22, 2020, entitled "System and Method for Scalable Cyber-Risk Assessment of Computer Systems". The entire contents of U.S. patent application Ser. No. 16/855,282 are herein incorporated by reference.

The section headings used herein are for organizational purposes only and should not to be construed as limiting the subject matter described in the present application in any way.

INTRODUCTION

Cyber risk assessment of an organization is required for many tasks including internal auditing, cyber insurance underwriting, and cybersecurity due diligence. For example, cyber risks assessments for internal auditing may need to be performed for managing various third-party cyber risks, such as vendor risk management, supplier risk management, etc. For example, cyber risk assessment for cybersecurity may need to be performed for various diligence activities for business transactions, such as joint ventures, mergers and acquisitions. It is anticipated that there will be a growing need for cyber risk assessment for the foreseeable future.

BRIEF DESCRIPTION OF THE DRAWINGS

The present teaching, in accordance with preferred and exemplary embodiments, together with further advantages thereof, is more particularly described in the following detailed description, taken in conjunction with the accompanying drawings. The skilled person in the art will understand that the drawings, described below, are for illustration purposes only. The drawings are not necessarily to scale, emphasis instead generally being placed upon illustrating principles of the teaching. The drawings are not intended to limit the scope of the Applicant's teaching in any way.

FIG. 9 illustrates an embodiment of a graphical user interface (GUI) presenting results for multiple entities in a tabular format according to the present teaching.

DESCRIPTION OF VARIOUS EMBODIMENTS

Figure 1A:
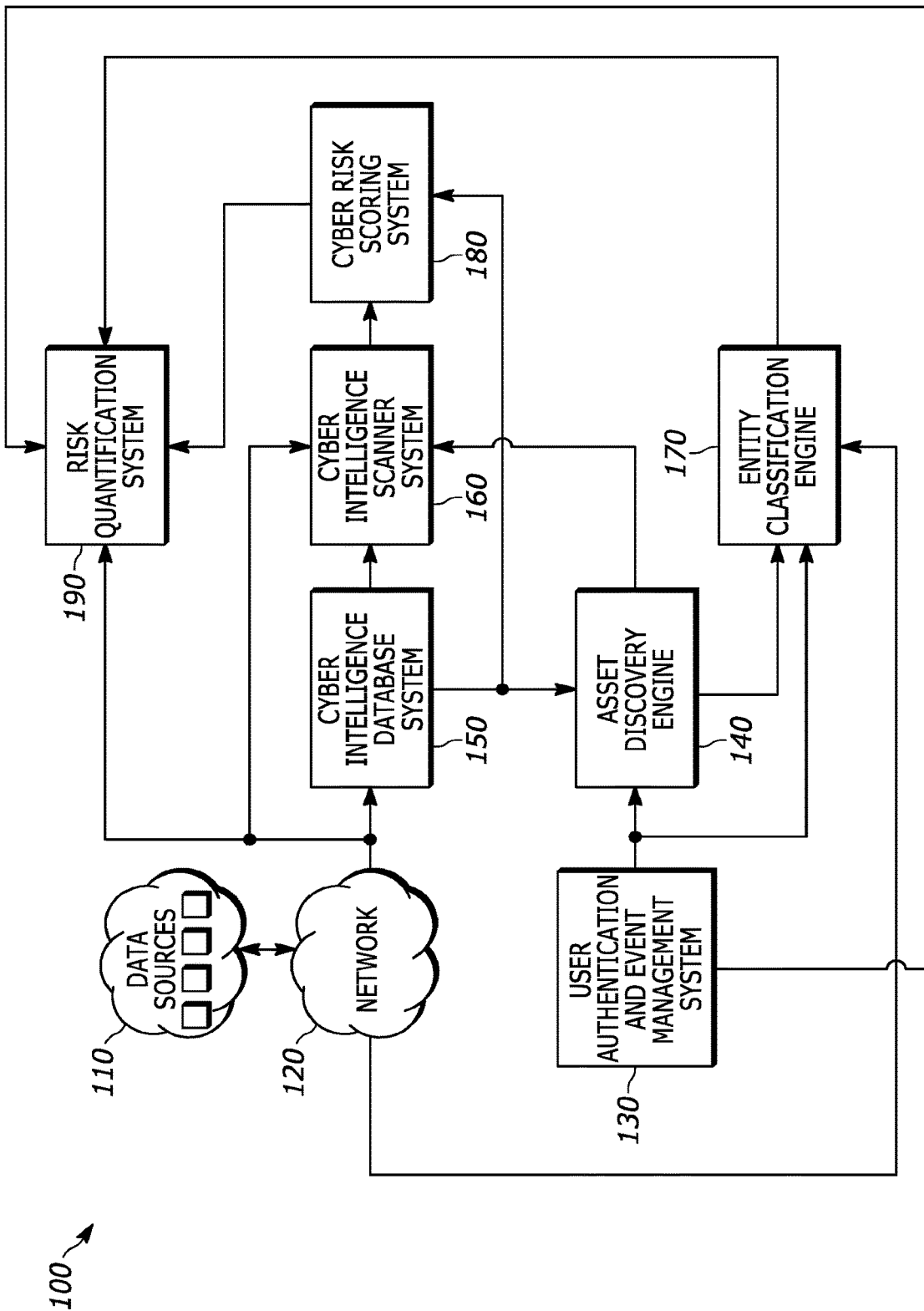
FIG. 1A illustrates a block diagram of an embodiment of a cyber risk assessment system that provides non-intrusive data gathering and risk quantification calculation according to the present teaching.

The present teaching will now be described in more detail with reference to exemplary embodiments thereof as shown in the accompanying drawings. While the present teachings are described in conjunction with various embodiments and examples, it is not intended that the present teachings be limited to such embodiments. On the contrary, the present teachings encompass various alternatives, modifications and equivalents, as will be appreciated by those of skill in the art. Those of ordinary skill in the art having access to the teaching herein will recognize additional implementations, modifications, and embodiments, as well as other fields of use, which are within the scope of the present disclosure as described herein.

Reference in the specification to "one embodiment" or "an embodiment" means that a particular feature, structure, or characteristic described in connection with the embodiment is included in at least one embodiment of the teaching. The appearances of the phrase "in one embodiment" in various places in the specification are not necessarily all referring to the same embodiment.

It should be understood that the individual steps of the methods of the present teachings can be performed in any order and/or simultaneously as long as the teaching remains operable. Furthermore, it should be understood that the apparatus and methods of the present teachings can include any number or all of the described embodiments as long as the teaching remains operable.

The problem of cyber risk assessment is a multi-dimensional problem that includes complex technical, financial, and compliance-related issues. Solving the problem of cyber risk assessment requires advanced methods and apparatus of data gathering, data analysis, and data processing. In addition, methods and apparatus for effective and efficient data presentation of aspects of cyber risk assessment are needed. As such, new apparatus and methods are needed to improve cyber-risk assessment of an organization that provides high-quality risk assessments. For many applications, these new systems and methods need to be non-intrusive, simple to use, cost effective, standards compliant and scalable to large third-party ecosystems.

One feature of the apparatus and method of the present teaching is that it addresses the challenges in providing cyber risk assessment for an organization's cyber systems, especially those that include third-party systems. In one embodiment of the present teaching, the probable financial impact of a data breach is considered to be a good parameter to quantify the cyber risk. For example, for third-party risk management (TPRM), knowing the probable financial impact of a data breach caused by a third party enables organizations to better assess the cyber risk against their third parties, prioritize third parties with respect to the probable loss, plan how to remediate the risks, and provide off- or on-site audits.

The number of organizations considered as a third party might be hundreds, even thousands for large organizations. One challenge of current cyber-risk assessment is that current risk quantification technologies that provide the probable financial impact of a data breach do not scale well for a large number of entities. This is, at least in part, due to the fact many current cyber-risk assessment apparatus and methods use a manual process of gathering information. Another challenge of current cyber-risk assessment is that some of the information gathered may be subjective due to the use of questionnaires answered by third-party entities.

One aspect of the present teaching is the use of risk quantification techniques that are scalable for a high number of entities because they rely on technical data gathered non-intrusively to significantly lower the cost of third-party risk management requirements. Thus, in some embodiments, methods and apparatus of the present teaching provide non-intrusive data gathering for the collection of inputs required for scalable cyber risk quantification, calculation of cyber risk quantification with collected data, and graphical user interfaces to present the results. It should be understood that the present teachings can be embodied in various methods, systems and/or non-transitory computer readable storage medium.

The term "non-intrusive" as used herein refers to the commonly understood meaning of the term applied to the collection of data over a network. The concept of non-intrusive data gathering is described in Open Source Intelligence (OSINT) documents. In particular, security assessments are described in certain NIST publications, such as NIST Special Publication No. 800-115 in, for example, Sections 2.3 and 2.4. In addition, the concept for non-intrusive data gathering is described in the MITRE's ATT&CK framework, in particular under the Technical Information Gathering section. See, for example, the description of acquiring of OSINT data sets and information.

One example of what we mean by non-intrusive gathering of data over a network is to collect data without requiring the active participation of the entity associated with the data. This generally means that no human intervention is required. Another example of what we mean by non-intrusive gathering of data is to collect data with minimal or essentially no interruption to the operation of the entity associated with the data. That is, the non-intrusive gathering of data essentially does not disturb the entity associated with the data in a significant way and generally does not require active participation persons associated with the entity. It should be understood that the meaning of non-intrusive gathering is not based on whether or not permissions are granted from an entity. Permissions are not particularly relevant as cyber criminals don't ask for permission.

In contrast, "intrusive" collection of data would be acquiring data by requesting a significant action (especially human action) from the entity associated with the data. For example, in many known methods of cyber-risk assessment of a computer system data is intrusively collected by asking the entity associated with the data to complete a written survey, which often take several hours for a skilled information technologist professional to complete. There are many problems associated with written surveys. For example, one problem is that it is difficult to get persons knowledgeable of the relevant facts to complete the survey in a timely manner as these individuals are generally busy administering and protecting the entity's computer system leading to a delay in processing the information and determining the associated risk. The second problem is that these surveys are completed at one particular time and are often not repeated for long periods of time, which can, for example, be on a yearly time schedule. In any event, the time between written surveys is almost always very long compared to the time scale that risk assessments of computer systems are needed to properly assess on going risk to an entity.

FIG. 1A illustrates a block diagram of an embodiment of a cyber risk assessment system 100 that provides non-intrusive data gathering and risk quantification calculation according to the present teaching. The system 100 relies on information non-intrusively gathered from a variety of data sources 110 that are publicly and/or privately accessible. The data sources can be, for example, any data source that is free-to-use and/or a paid/subscriber-based source. For example, data sources can include data providers, websites, internet forums, web crawler, honeypot, data collector, internet-wide scanners, news sites, paste sites, regulatory authorities, reports, social sites, and/or internet sits residing in the deep web or darknet. The data sources 110 are reachable through a communication network 120 that is also connected to computer resources that are used to execute the method of cyber risk assessment and implement the cyber risk assessment system 100 according to the present teaching.

A user authentication and event management system 130 receives requests from users. In some methods according to the present teaching, users initiate a request for a quantitative cyber risk assessment of an entity that is associated with a particular domain name. The entity may be a third-party entity so that the user can obtain a quantitative risk assessment of the third-party's cyber risk.

The user authentication and event management system 130 is in communication with an asset discovery engine 140. The term engine as used herein refers to software that executes codes to perform certain calculations based on given inputs and the computer resources used to execute that software. The computer resources used to execute the application may refer to, but are not limited to, partial resources of hardware associated with a computer system that has one or more CPUs, RAMs, ROMs, data storage units, I/O adapters, and communication adapters.

In some methods according to the present teaching, the asset discovery engine 140 discovers a digital footprint of the entity based on the associated domain name and based on non-intrusively gathered information from a computer network 120 and from various connected data sources 110. The user authentication and event management system 130 is also in communication with an entity classification engine 170, which classifies entities to determine a specific entity classification. For example, the entity classification can be based on entity size, location and/or other classification features that lead to risk quantification parameters, such as country, the size of the entity, and the industry of the entity that are derive non-intrusively from data sources 110.

The asset discovery engine 140 is in communication with a cyber intelligence database system 150 that fetches a list of control items that is generated using the non-intrusively gathered information from the computer network 120 and from the data sources 110 and that is based on the discovered digital footprint of the entity. The term database as used herein refers to one or more data storage units that reside in local computer system (server) or mainly in a distributed cloud environment (servers or blades). The storage units are connected to input/output adapters that write and read information. These distributed storage units can be accessed with the use of database management software (DBMS), which is a computer program that interacts with end users, applications, and the database itself to capture and analyze the data. The servers or blades are the physical hardware that must have one or more data storage drive (e.g., hard disk drive), processors (CPUs), power supply units, cooling units, and communication adapter (network interface).

The asset discovery engine 140 and cyber intelligence database system 150 are both in communication with a cyber intelligence scanner system 160. The cyber intelligence scanner system 160 scans the cyber intelligence database system 150. In addition, the cyber intelligence scanner system 160 also non-intrusively gathers information from the computer network 120 and connected data sources 110 based on the discovered digital footprint and based on the list of control items to determine an entity technical finding. The scanner produces entity technical findings.

A physical embodiment of scanners according to the present teaching, such as the cyber intelligence scanner system 160 and the scanners 161, 162, 163, 164 described in connection with FIG. 1B, includes an application program and associated computer resources required to execute that application. The application allows users or other programs to execute queries to data sources or databases by sending codes to database management software. The interactions to the database or data sources can be executed via an Application Programming Interface (API) or database language supported by interacted database or data source. The computer resources used to execute the application may refer to, but not limited to, partial resources of hardware of a computer system that has one or more CPUs, RAMs, ROMs, data storage units, I/O adapters, and communication adapters.

A cyber risk scoring system 180 receives data of the cyber intelligence scanner system 160. The cyber risk scoring system 180 produces scored technical findings and provides them to a risk quantification system 190. In some method according to the present teaching, the cyber risk scoring system 180 and/or the risk quantification system 190 rely on industry-related quantification parameters that are generated based on the entity technical finding and based on the entity classification. The risk quantification system 190 computes a loss frequency and a loss magnitude using the entity technical finding(s), the entity risk quantification parameter(s) and the industry related quantification parameter(s). The risk quantification system 190 then computes a quantitative risk value based on the loss frequency and loss magnitude.

In some methods, the quantitative risk value is strictly a monetary value, such as a U.S. dollar value. In other methods, the quantitative risk value includes another type of value that may or may not have a monetary value component, such as a nuisance value, reputation value, security posture value, and/or various combinations of these and/or other values. In some methods, the user authentication and event management system 130 also provides user inputs to the risk quantification system 190 so that user-adjustable parameters can be input and used to influence the quantitative risk value calculation.

Figure 1B:
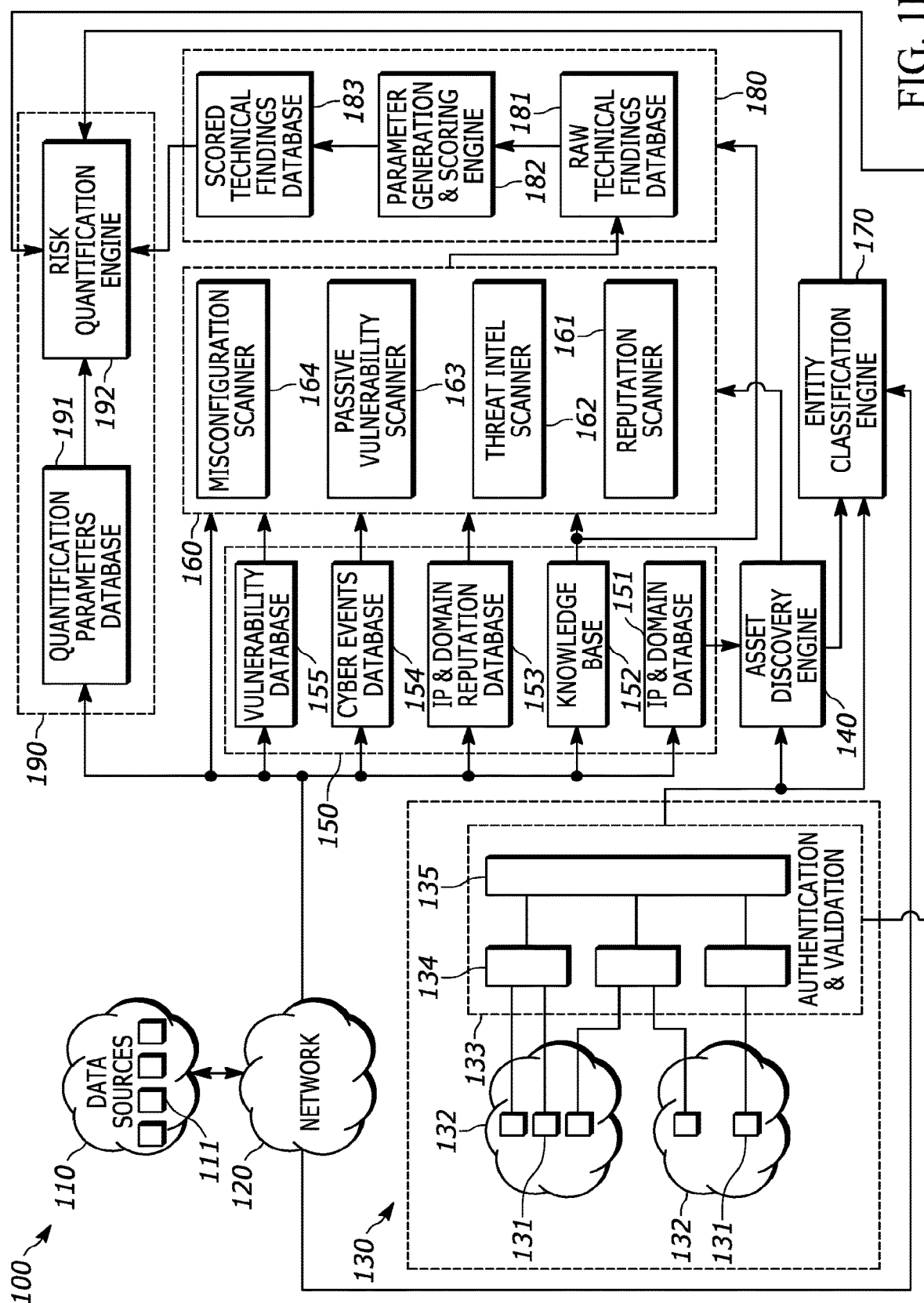
FIG. 1B illustrates a block diagram with subsystem detail of an embodiment of a cyber risk assessment system that provides non-intrusive data gathering and risk quantification calculation according to the present teaching.

FIG. 1B illustrates a block diagram with subsystem detail of an embodiment of a system that provides non-intrusive data gathering and risk quantification calculation according to the present teaching. The relevant data is gathered from data sources 110 that are publicly or privately accessible. The data sources can be any data source free-to-use or paid/subscriber-based source. For example, the particular data source 111 can be a data provider, website, forum, web crawler, honeypot, data collector, internet-wide scanner, news sites, paste sites, regulatory authorities, reports, social sites, a site residing in deep web or darknet (i.e., a website that can be reachable with only special tools, methods, etc.). That is, the particular data source 111 can be any data source that provides information about an "entity" and that can be reachable through a communication network 120. The communication network 120 can be one or more networks to which various databases in the cyber intelligence database system 150 are in communication with, including, for example, various public and private networks and internetworks that operate over a variety of wired and/or wireless infrastructure. One skilled in the art will appreciate that the term "entity" as used herein generally refers to any organization, corporation, firm, company, or institution associated with a network domain name.

FIG. 1B also includes risk quantification request system 130 where users request risk quantification results for a single entity or multiple entities. It should be understood that the entity whose cyber risk is requested can be the entity of the user or a third party with whom that user's entity engage. The request system 130 includes user devices 131 that request and receive information. The user devices 131 can be located in one or multiple network domains 132. The user devices 131 can be any device that has the necessary hardware and software to log in to a cloud-based system. For example, any network-accessed processor-based device can be utilized including, but not limited to, personal computers, laptop computers, mobile devices, smartphones, and tablet computers.

User devices 131 communicate with an authentication and validation module 133 where user login requests are handled by login processes 134. After logging in, users can request cyber risk quantification for a single entity, or multiple entities, by giving the domain name(s) of the entity/entities as input(s). These user requests are handled (e.g., processed, scheduled, and initiated) by an event manager 135.

The domain names of an entity provided by the user in the user request are forwarded to an asset discovery engine 140 that determines the internet-facing assets of an entity using non-invasive techniques that require no human intervention. A determined description of all or nearly all of the internet-facing assets of an entity is referred to herein as a digital footprint. One skilled in the art will appreciate that the term "asset" as used herein generally refers to internet metrics such as domains, Internet Protocol (IP) addresses, blocks of IP addresses, subdomains, Domain Name Server (DNS) records, websites, Autonomous System Numbers (ASN), which is a unique number assigned to an autonomous system by the Internet Assigned Numbers Authority (IANA), web services, social media accounts, e-mail addresses, and/or other internet-facing element that belongs to digital footprint of an entity. An engine as described herein is a software application that executes code to perform certain calculations based on given inputs. These engines also include the computer resources used to execute that software, which can be, but are not limited to, computer hardware resources such as one or more of CPUs, RAMs, ROMs, data storage units, I/O adapters, and communication interfaces.

A cyber intelligence database system 150 comprises one, or more commonly, a set of databases that non-intrusively gather information from data sources 110 through the communication network 120. The IP and domain database 151 gathers information about registered domains, IP addresses, and assets associated with those domains and IP addresses. The IP and domain database 151 is updated periodically and/or updated on-demand. Also, the IP and domain database 151 provides information to asset discovery engine 140.

The knowledge database 152 creates and maintains a list of control items that need to be checked to assess the cyber risk of a company. The knowledge database 152 is populated and updated by pulling information from and being pushed information by any of various data sources 110 through the network. In many methods according to the present teaching, the information is pulled and pushed non-intrusively. For example, the list of control items can be updated based on various information, such as open standards, regulations, frameworks, internal data, or any other of various information from one or more of data sources 110 that provides such control items and their related parameters such as the severity, technical impact, likelihood of exploit, etc. through network 120.

The IP and domain reputation database 153 gathers information from blacklist and reputation data sources amongst the data sources 110 through the network 120. The IP and domain reputation database 153 is updated periodically and/or on-demand. The cyber events database 154 gathers information from forums, news sites, websites, social networks, and any other data resources amongst data sources 110 that can give information about a cyber event through the network 120. For example, cyber threat activity information can be provided to the cyber events database 154 through the network 120. The cyber events database 154 is updated periodically and/or on-demand. The vulnerability database 155 gathers information for vulnerabilities on certain version(s) of certain hardware or software from one or more data sources 110 through the network 120. For example, the vulnerability database 155 can gather information from one or more of the National Vulnerability Databases. The vulnerability database 155 is updated periodically and/or on-demand.

The cyber intelligence database system 150 including databases 151, 152, 153, 154, 155. It should be understood that these particular databases are examples and don't limit the present teaching. Many other types of databases can be used. In various embodiments, the cyber intelligence database system 150 can be extended with other databases that provide valuable information to determine the cyber risk of an entity.

One feature of the present teaching is that the data gathering is performed using a non-intrusive methodology as described herein. The cyber intelligence database system 150 including one or more of databases 151, 152, 153, 154, 155 can be implemented as, for example, one or more data storage units that reside in a local computer system and/or reside in a distributed cloud environment (servers or blades). The local computer system can, for example, be a conventional computer server. The distributed cloud environment are often rack based computer servers and/or blades. The servers or blades are physical hardware that can have one or more data storage devices (e.g., hard disk drive), processors (CPUs), power supply units, cooling units, and communication adapter or network interface. The data storage units can be connected to input/output adapters to write and read information. These data storage units, which in some embodiments are distributed data storage units, can be accessed with the use of database management software (DBMS). Database management software is a computer program that interacts with end users, applications, and the database itself. Database management software allows users, applications, and/or a database to capture and analyze data, store data in the database and access data in the database. The various databases 151, 152, 153, 154, 155 are able to communicate with each other and with other systems and the network 120 using various communications adapters and/or network interfaces.

At least some of the databases in the cyber intelligence database system 150 communicate with a cyber intelligence scanner system 160. For example, one or more of the vulnerability database 155, the cyber events database 154, the IP and domain reputation database 153 and/or the knowledge database 152 may communicate with the scanner system. The cyber intelligence scanner system 160 is also in communication with the asset discovery engine 140. The cyber intelligence scanner system 160 scans the information in the databases of the cyber intelligence database system 150 with respect to the outputs generated by the asset discovery engine 140. For example, a reputation scanner 161 searches for related reputation data in the IP and domain reputation database 153 for the assets discovered by asset discovery engine 140. The reputation scanner 161 also checks control items relevant to reputation from the list provided by knowledge base 152 for these assets. Also, a threat intelligence scanner 162 searches for related threat data in cyber events database 154 for the assets discovered by asset discovery engine 140. The threat intelligence scanner 162 also checks control items relevant to threat intelligence from the list provided by knowledge base 152 for these assets. A passive vulnerability scanner 163 searches for related vulnerability data in vulnerability database 155 for the assets discovered by asset discovery engine 140. The passive vulnerability scanner 163 also checks control items relevant to vulnerabilities from the list provided by knowledge base 152. For the entity or entities that are part of a user request, a mis-configuration scanner 164 gathers information about the possible misconfiguration on the entity's systems such as e-mail, DNS, network, etc. from data sources 110 through the network 120. The misconfiguration scanner 164 also checks relevant control items relevant to misconfiguration and/or the entity from the list provided by knowledge base 152.

The authentication and validation module 133 and the asset discovery engine 140 are in communication with an entity classification engine 170. The entity classification engine 170 detects the risk quantification parameters, such as country, the size of the entity, and the industry of the entity from data sources 110 through the network 120 with respect to outputs generated by the asset discovery engine 140. For instance, the country of the entity can be determined from country Top-Level-Domain (TLD) extension of the domain(s) of the entity. It also allows user input forwarded from the event manager 135.

The cyber intelligence scanner system 160 is in communication with a cyber risk scoring system 180 and the outputs of the cyber intelligence scanner system 160 are sent to the cyber risk scoring system 180. The cyber risk scoring system 180 is also in communication with the knowledge database 152. The cyber risk scoring system 180 includes a raw technical findings database 181, a parameter generation and grading engine 182, and a scored technical findings database 183. The cyber risk scoring system 180 also gets parameters from knowledge base 152. The outputs of the cyber intelligence scanner system 160 provide the results for each control item from the list provided by knowledge base 152 and these results are stored in raw technical findings database 181 as technical findings. The technical findings are provided to a parameters generation and scoring engine 182 that then scores each finding. For example, the score can depend on several parameters such as the age of the finding, severity of the finding, and/or other parameters. The score results from the parameter generation and scoring engine are saved to a scored technical findings database 183.

A risk quantification system 190 is in communication with the cyber risk scoring system 180, the entity classification engine 170, the authentication and validation module 133, and the communication network 120 and data sources 110. The risk quantification system 190 exploits results that are stored in the scored technical findings database 183 to calculate the cyber risk quantification. In some embodiments, the cyber risk quantification is a financial impact of a data breach. The risk quantification system 190 includes a quantification parameters database 191 that holds information about, for example the data breaches and their impact. This information is updated periodically and/or on-demand. The quantification parameters database 191 gets the necessary information from one or more of the data sources 110 through the network 120. For example, the quantification parameters database 191 gets the necessary information from e.g. public reports, news, regulatory sites, public announcements from entities that experienced a breach, and any such data sources through network 120. The results of entity classification engine 170, the data from quantification parameters database 191, and the data from scored technical findings database 183 become inputs to a risk quantification engine 192. In some embodiments, users may also adjust the parameters used for risk quantification, so user inputs also are carried to risk quantification engine 192 via the authentication and validation module 133.

One feature of the present teaching is that it is compatible with industry standard quantitative models for cyber security and operational risk. Some embodiments of the present teaching use the Open Factor Analysis of Information Risk (Open FAIR) system, which was developed by the FAIR Institute, which provides a framework for measurement, management, and reporting on cyber risk from a business perspective. Some embodiments use the World Economic forum methods, for example, the value-at-risk method. For example, International Organization for Standards (ISO) and/or International Electrotechnical Commission (IEC) standards and methods may be utilized. Some embodiments of the present teaching use the North American Industry Classification System (NIACS) standards. Relating to cyber threats, organizations such as MITRE and NIST have, e.g. Cyber Threat Susceptibility Assessment (CTSA) and Common Weakness Risk Analysis Framework (CWRAF) that may be included. Relating to compliance, standards and guidelines from ISO, HIPAA, NIST, the European Union General Data Protection Regulation (GDPR) and Payment Card Industry (PCI) may be included. In addition, inputs and assessments related to best practices, solutions and tools for third party risk management from Shared Assessments Group may be included.

One feature of the present teaching is that a risk quantification request proceeds automatically with only information about domain name or domain names associated with an entity. The system is able to calculate a financial risk by only passive, non-intrusive data gathering. The system is able to quantify that risk accurately and quickly, at least in part, because, unlike prior art risk quantification systems, it requires no human inputs to make a quantitative risk assessment.

In some embodiments, a user initiates a risk quantification request, and the system provides a quantified risk assessment related to the request. As an example, a user is connected to the system through a device 131 that is inside a network 132 and inserts his/her login credentials to a login user interface. The authentication and validation module 133 checks the login credentials and, if valid, the user interface illustrates an entry point where the user can provide the domain name of an entity to receive a cyber-risk quantification for that entity. The user inserts the domain name of the entity of interest. For this example, the domain name is examplesite.com for an entity of interest called Example Corporation (Example Corp.). The event manager 134 schedules this cyber-risk quantification request for the next available time in the system. Based on the availability of computer system resources, the waiting time can be less than or equal to a millisecond. In general, waiting times can be on the order of a few milliseconds, although longer waiting times are also possible.

When the system resources are available, the event manager 134 pushes this request to the asset discovery engine 140 and entity classification engine 170. The asset discovery engine 140 pulls the digital footprint information about Example Corp. from the IP & domain database 151. The digital footprint information includes, for example, the domain names (e.g., examplesite.com), IP addresses (e.g., 91.195.240.126), subdomains (e.g., community.examplesite.com, orums.examplesite.com, etc.), domain name server (DNS) Records (which includes, for example, A records, MX records, Namerservers, and any other related records), services (e.g., HTTP, FTP, Telnet/SSH, etc.), servers and/or their versions used by the entity (according to information gathered from data sources 111), social media accounts of the entity (including, but not limited to, Twitter, Facebook, Linkedin accounts), AS numbers (e.g., AS47846), and/or e-mail addresses (e.g., forms@examplesite.com).

After obtaining the digital footprint information, the asset discovery engine 140 triggers cyber intelligence scanner system 160 by giving a digital footprint of the entity as inputs. All the scanners 161, 162, 163, 164 in the cyber intelligence scanner system 160 executes their search on the related databases, which in the example shown is one or all of database 151, 153, 154, 155 for the control items listed in the knowledge base 152.

The reputation scanner 161 scans the IP and domain reputation database 153 to search IP addresses and domain names of the entity. The results include, but are not limited to, blacklisted IP addresses of the entity, possible fraudulent domain names, or possible fraudulent mobile applications related to Example Corp.

Similarly, the threat intel scanner 162 scans the cyber events database 154 to search the entity name(s), domain names, IP addresses, subdomain names, and any other related digital asset that are part of the digital footprint of the entity. The results include, but not limited to, any mention of Example Corp's name or assets in hacker forums, social network, data breach indexes, etc.

The passive vulnerability scanner 163 scans the vulnerability database 155 to search for possible vulnerabilities that may be present on the entity's services and servers. The results include the possible vulnerabilities for digital assets that are part of the digital footprint of the entity.

The results provided by the scanners 161, 162, 163, 164 are referred to herein as technical findings. The technical findings are provided by the cyber intelligence scoring system and saved to the raw technical database 181 in the cyber risk scoring system 180. The parameter generation and scoring engine 182 fetches the results from the raw technical database 181, generates parameters, and calculates the score for each technical finding. In some embodiments, the scoring can be done by use of open standards or frameworks such as MITRE's Cyber Threat Susceptibility Assessment Framework (see, for example, https://www.mitre.org/publications/systems-engineering-guide/enterprise-engineering/systems-engineering-for-mission-assurance/cyber-threat-susceptibility-assessment) or ATT&CK Framework (see, for example, https://attack.mitre.org/). The scored technical findings are saved to the scored technical findings database 183.

Meanwhile, the entity classification engine 170 scans the data sources 110 through network 120 to determine the industry category of Example Corp. and the country of the entity. For this example, the entity classification engine 170 classifies the industry of this entity as Other Services and the country as United States. The entity classification engine 170 also receives input from the asset discovery engine 140 to compute the digital footprint size of the company. In some embodiments, the size of the company can be represented with a number between one and ten, in which a one may represent an entity that has very low digital footprint on the cyber space and a size of ten is for an entity that has a large presence on the cyber space, i.e., a large digital footprint with a large number and span of assets. In the example, Example Corp. has a very limited number of digital assets, and the entity classification engine 170 has a size represented by the number one.

The risk quantification engine 192 receives the information from the entity classification engine 170 and fetches the technical findings from the scored technical findings database 183. It computes the cyber risk in financial terms by also fetching information from quantification parameters database 191. The risk quantification engine 192 first computes the loss event frequency with one or more routines, for example as described in connection with FIG. 5. For instance, in this example, a loss event frequency of 0.0083 is computed for Example Corp. Next, the risk quantification engine 192 computes the loss magnitude with routines as defined herein, and described, for example, in connection with the description of FIG. 6. In this particular example, the loss magnitude has a value of $4,850,054 for Example Corp. Note that this value is, in some embodiments, representative of a particular point in time. That is, the value represents a value for a particular day and time.

In a next step, the risk quantification engine 192 then quantifies the risk from the two values of the loss event frequency and the loss magnitude. In this particular example, the risk quantification results in a value of $40,200 at this time. The results may be displayed to the user in a variety of ways, such as through a graphical user interface. For example, the graphical user interface shown in FIG. 8 which is described further below can be used. The graphical user interface in some embodiments allows users to manipulate the results by changing the parameters affecting the results. If a change is requested, a user provides the request from the user device 131 and the event manager 135 delivers this request to the risk quantification engine 192. Then, the risk quantification engine 192 recalculates the risk with this new information. One skilled in the art will appreciate that the above description provides an example intended to illustrate operation of the method of quantitative risk assessment according to the present teaching, and should not be considered as limiting the present teaching in any way.

Figure 2:
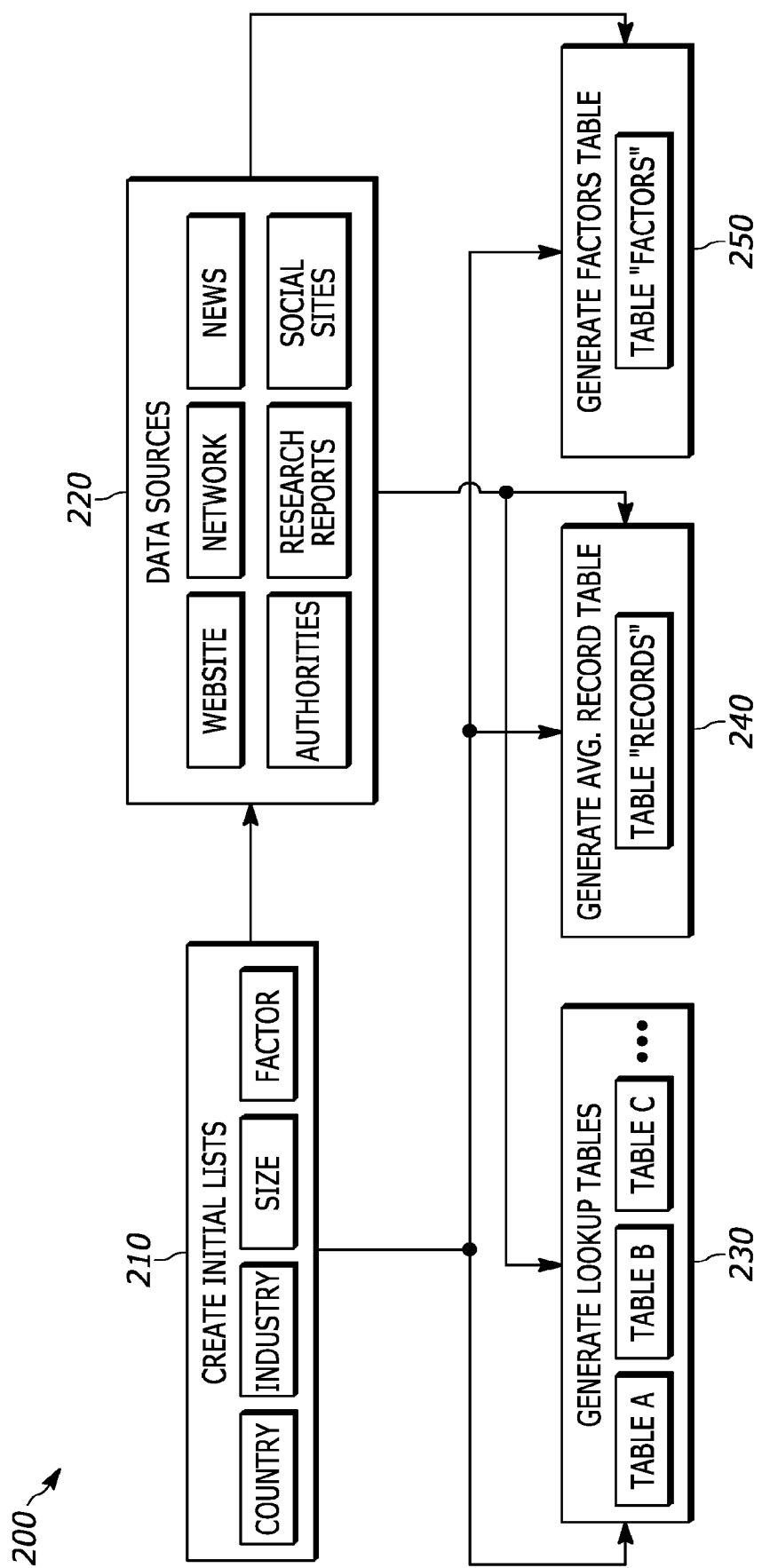
FIG. 2 illustrates a block diagram of an embodiment of a system for cyber-risk quantification that gathers information to create input tables according to the present teaching.

FIG. 2 illustrates a block diagram 200 of an embodiment of a system for cyber-risk quantification that gathers information to create input tables according to the present teaching. A create initial list module 210 is in communication with one or more data sources 220, a generate lookup table module 230, a generate average record table module 240, and a generate factors table 250. The data sources 220 are in communication with the generate lookup table module 230, the generate average record table module 240, and the generate factors table 250.

The block diagram 200 illustrates how the data in quantification parameters database 191 described in connection with FIGS. 1A-B is gathered and stored. The create initial lists module 210 creates the initial sets that includes, for example, lists of country, industry, size, and factors. The data sources 220 can be a subset of the data sources 110 that are described in connection with FIGS. 1A-B. The data sources 220 can include one or more of entity websites, news sites, authorities such as European Union General Data Protection Regulation (EU GDPR) offices, research reports on data breaches, and/or social sites that provide information about data breaches. The generate lookup tables module 230 generates lookup tables by processing information gathered from the create initial lists module 210 and the data sources 220. Similarly, the generate average record table module 240 generates the average records breached for a specific industry, country, and/or entity size. These average records can be provided as a records table. The term "record" as used herein generally refers to a piece of information digitally kept by an entity and its exposure creates costs such as regulatory fines. Personally identifiable information, patient health information, credit card information are examples of such records.

The factors generator module 250 also processes information from create initial lists module 210 and data sources 220 to create a table of factors that are present for a specific industry, country, and entity size. The term "factor" as used herein generally refers to certain situations where their presence affects the cost of a data breach. For example, the extensive use of mobile platforms by an entity increases the cost of a data breach or having a data leak protection (DLP) system decreases the cost of a data breach.

Figure 3:
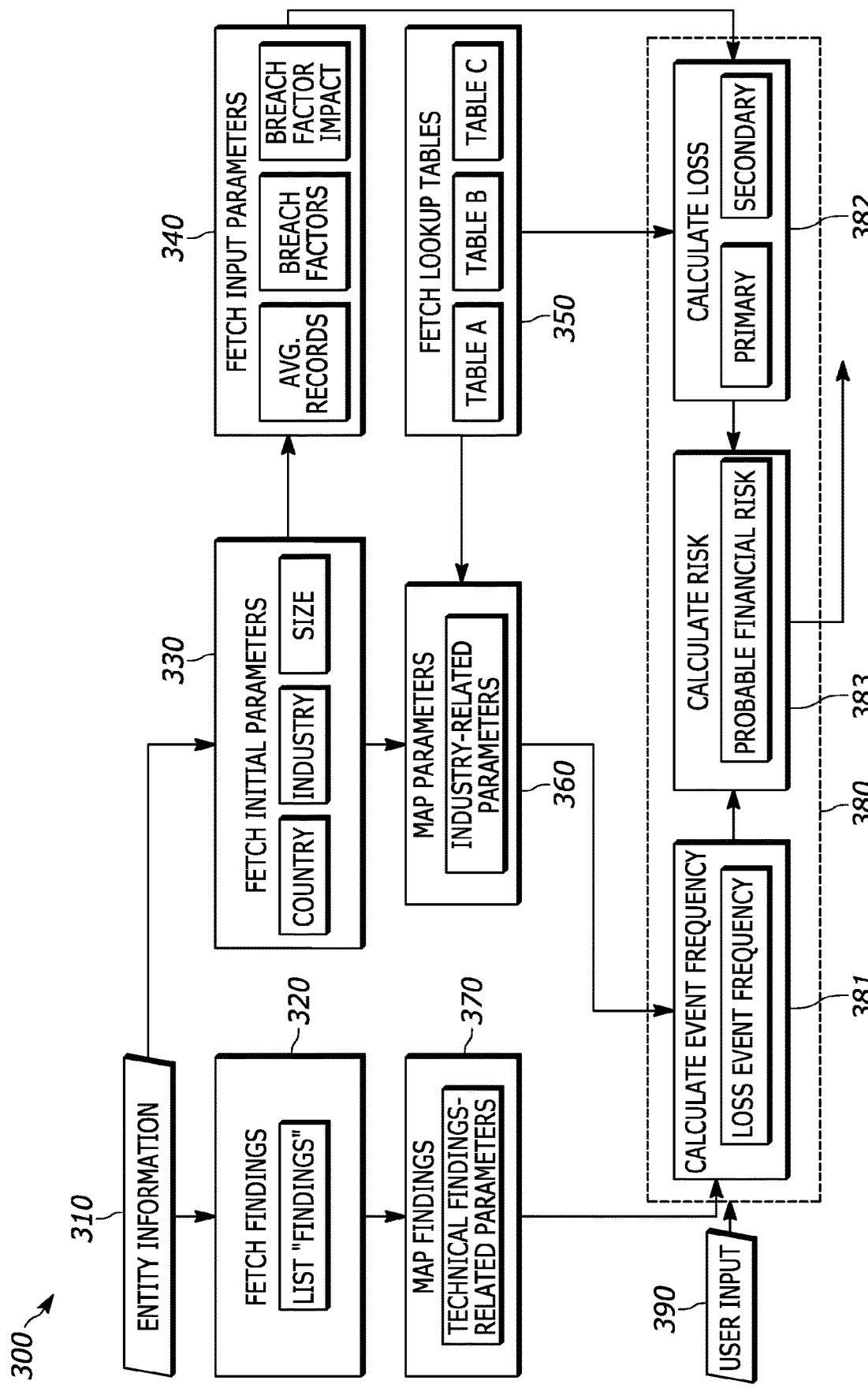
FIG. 3 illustrates a block diagram of an embodiment of a system for cyber-risk quantification that calculates the probable financial impact for an entity according to the present teaching.

FIG. 3 illustrates a block diagram 300 of an embodiment of a system for cyber-risk quantification that calculates the probable financial impact for an entity according to the present teaching. This embodiment of the system for cyber-risk quantification can be used to calculate the probable financial impact for an entity that is run by the risk quantification engine 192 described in connection with FIGS. 1A-B.

Referring to FIGS. 1A-B, FIG. 2 and FIG. 3, the entity information 310 inserted by the user to the authentication and validation module 133 initiates a cyber risk quantification calculation. The system then fetches the list of technical findings 320 from the scored technical findings database 183 and fetches initial parameters 330 such as country, industry, and size from entity classification engine 170. The system fetches, in an input parameters module 340, avg. records and breach factors parameters and also fetches information from the lookup tables module 350, all are generated in generate lookup table module 230 and stored in the quantification parameters database 191.

Some of the parameters required for a calculation of risk quantification are industry-related parameters. Other of the parameters required for a calculation of risk quantification depend on the country, industry, and/or the size of the entity. For example, parameters, such as threat capability, which represents the capability of the threat community in successfully carrying out the threat event, can be estimated from the lookup tables 350. A map parameters module 360 maps the initial parameters to lookup tables to generate industry-related parameters.

Other parameters for cyber risk quantification are marked as technical findings-related parameters, such as resistance strength, probability of action, and contact frequency. They are obtained by mapping the technical findings from the list of findings fetched by fetching a list of findings 320. A map findings module 370 performs this mapping operation and computes the technical-related parameters that are provided to a cyber risk quantification module 380.

The parameters computed in modules 340, 350, 360, and 370 are transferred to the cyber risk quantification module 380 that consists of three sub-modules, namely a loss event frequency calculation module 381, a loss calculation module 382, and a probable financial risk calculation module 383. Specifically, the map parameters module 360 and the map finding module 370 are in communication with calculate event frequency module 381, and the fetch lookup tables module 350 and the fetch input parameters module 340 are in communication with calculate loss module 382. Calculate event frequency module 381 and calculate loss module 382 are in communication with the calculate risk module 383. Optionally, users can adjust these calculations if they desire to know the results for different input parameters. Thus, user input 390 can also be inserted into cyber risk quantification module 380 by the event manager 135.

The event frequency calculation module 381 receives industry-related parameters from map parameters module 360 and technical-findings related parameters from module 370. The loss calculation module 382 receives the input parameters from module 340 and relevant lookup tables from fetch lookup tables module 350. The probable financial risk calculation module 383 uses outputs of calculate event frequency module 381 and calculate loss module 382.

Figure 4:
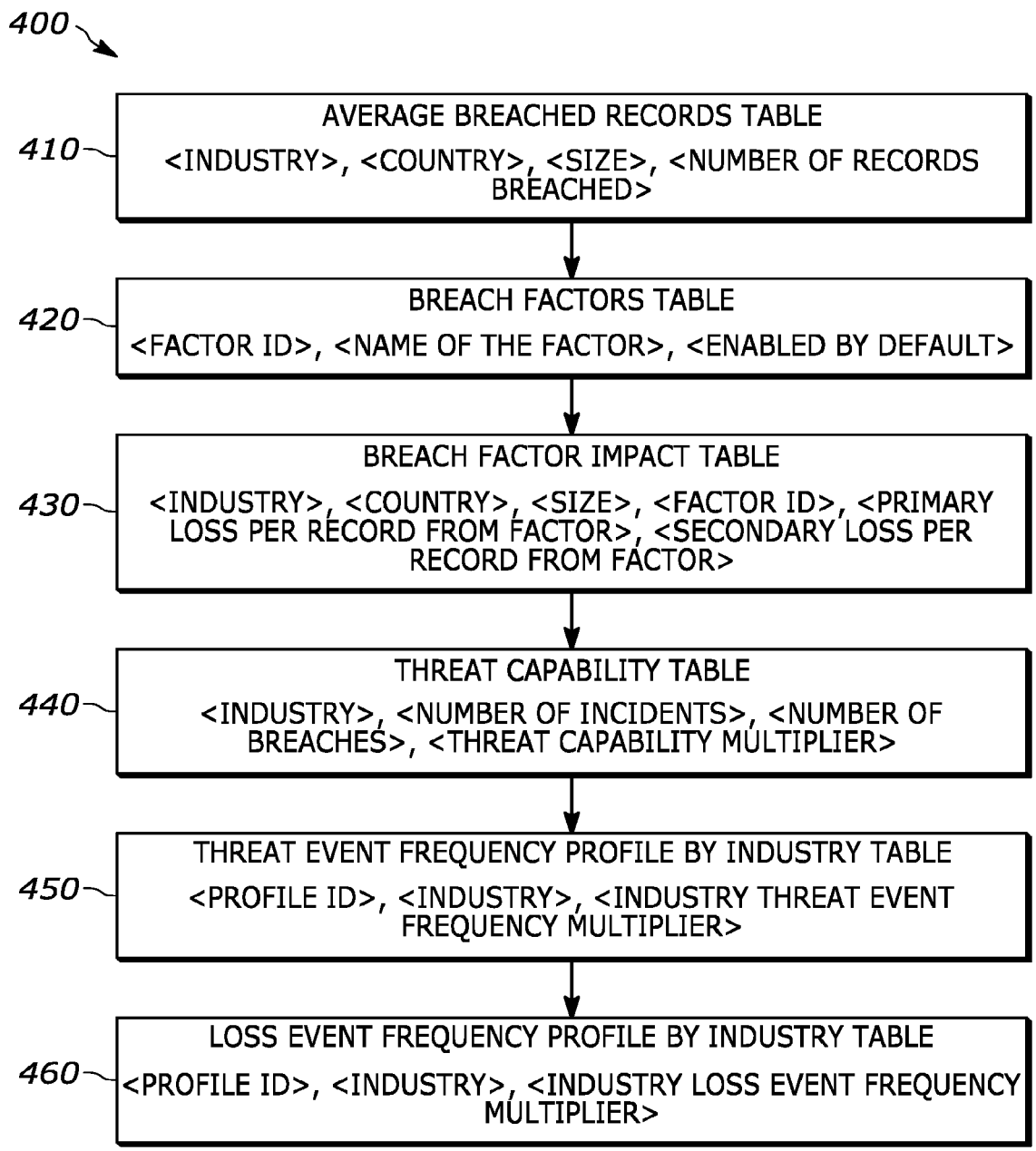
FIG. 4 illustrates a block diagram showing various aspects of tables used in an embodiment of calculating the statistical financial impact of a data breach according to the present teaching.

FIG. 4 illustrates a block diagram 400 showing various aspects of tables 410, 420, 430, 440, 450, 460 used in an embodiment of calculating a statistical financial impact of a data breach according to the present teaching. The tables 410, 420, 430, 440, 450, 460 can be used to determine one or more quantification parameters that are used to calculate a quantitative risk value for an entity. The block diagram 400 includes elements that are connected to various modules described in connection with the gathering and storing of information described in connection with FIG. 2. Referring to all of FIGS. 1-4, the average-breached records table 410 includes entries with the following fields: country, industry, size, number of records breached. This table 410 is generated by the generate average records module 240 in the quantification parameters database 191 and the fetched-parameters provided by fetch-input parameters module 340 to be used in the calculation of loss by calculate loss module 382.

A breach factors table 420 includes entries with the following fields: factor identification number (factor id), name of the factor, and enabled by default. Factor id is used to uniquely identify each factor that affects the costs of a data breach. The enabled by default field provides a Boolean operator (yes or no) to determine if the factor should be taken into consideration by default. This breach factors table 420 is generated by generate factors table module 250 in quantification parameters database 191 and by the fetch input parameters module 340 to be used in the calculation of loss by the calculate loss module 382.

A breach factor impact table 430 contains data about how each factor affects data breach for different countries, industry, and the size of the entities. The table 430 includes entries with the following fields: industry, country, size, factor id, primary loss per record from factor, and secondary loss per record from factor. The table 430 is generated by the generate factors table module 250 in the quantification parameters database 191 and fetched by the fetch module 340 to be used in the calculation of loss by calculate loss module 382.

A threat capability table 440 stores statistical information of the threat capability of a certain industry. The table 440 includes entries with the following fields: industry, number of incidents, number of breaches, and threat capability multiplier. The table 440 is generated by the generate lookup tables module 230 in the quantification parameters database 191 and fetched by the fetch lookup tables module 350 to be used in the mapping industry-related parameters by map parameters module 360.

One aspect of the present teaching is that industry-related parameters can also generated. For example, a threat event frequency profile by industry table 450 contains statistical information about the frequency of threats for certain industries. The table 450 includes entries with the following fields: profile id, industry, industry threat event frequency multiplier. This table is generated by the generate lookup tables module 230 in quantification parameters database 191 and fetched by the fetch lookup tables module 350 to be used in the mapping industry-related parameters by map parameters module 360.

Another industry related parameter is loss event frequency profile by industry table 460 contains statistical information about the frequency of financial loss for certain industries. The table 460 includes entries with the following fields: profile id, industry, industry threat event frequency multiplier. This table is generated by the generate lookup tables module 230 in the quantification parameters database 191 and fetched by the fetch lookup tables module 350 to be used in the mapping industry-related parameters by map parameters module 360.

Figure 5:
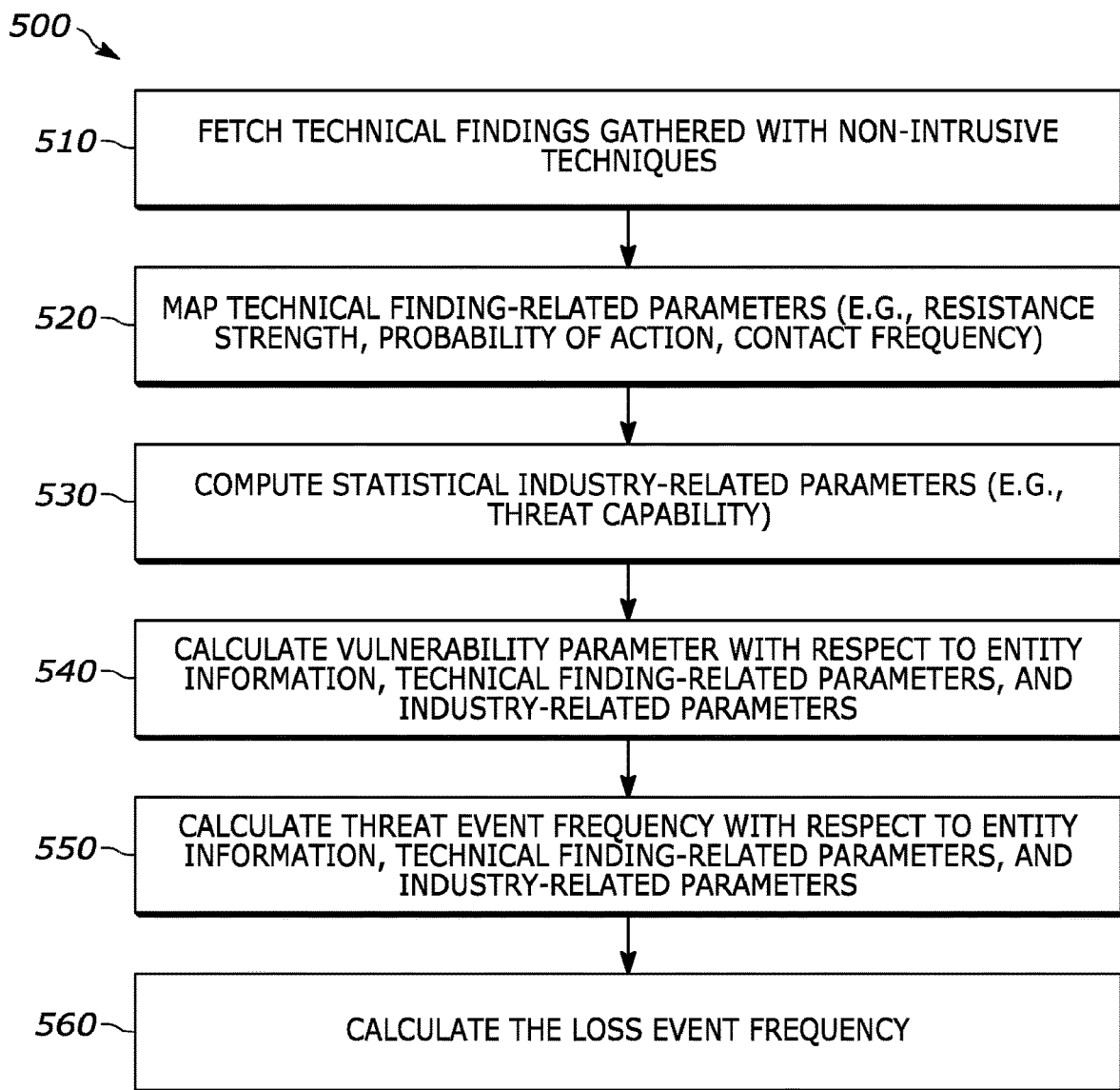
FIG. 5 illustrates a flow diagram of an embodiment of a method for non-intrusive calculation of loss event frequency according to the present teaching.

FIG. 5 illustrates a flow diagram of an embodiment of a method for non-intrusive calculation of loss event frequency 500 according to the present teaching. The loss event frequency is a parameter which is essential to calculate probable financial impact. Referring to FIGS. 1-5, in a first step 510, a routine fetches the technical findings of the entity gathered with non-intrusive techniques. In some embodiments, this first step 510 is executed by the fetch findings module 320 that gathers relevant data from the scored technical findings database 183. In a second step 520, a routine maps the technical finding-related parameters such as resistance strength (the level of difficulty that a threat agent must overcome), probability of action (the probability that a threat agent will act upon an asset once contact has occurred), and contact frequency (the probable frequency, within a given time frame, that threat agents will come into contact with assets). In some embodiments, the second step 520 is executed by map findings module 370.

In a third step 530, a routine computes the industry-related parameters, such as threat capability by using initial parameters fetched. The initial parameters can be fetched, for example, by the fetch initial parameters module 330, and by lookup tables, such as the threat capability table 440, and fetched by the fetch lookup tables module 350. The routine can be executed, for example, by the map findings module 370.

In a fourth step 540, a routine calculates the vulnerability parameter defined as the probability that a threat agent's actions will result in loss. In some embodiments, the routine is executed by the calculate event frequency module 381 and includes inputs of the results of routines the second step 520 (e.g., resistance strength) and the results of third step 530 (e.g., threat capability).

In a fifth step 550, a software routine calculates the threat event frequency. In some method, this calculation uses outputs generated by the map parameters module 360 and by the map findings module 370. In addition, this calculation use data from lookup tables, such as the threat event frequency by industry table 450. The software routine can be executed by the calculate event frequency module 381 and can use inputs of the results of the second step 520 (e.g., contact frequency and the probability of action).

In a sixth step 560, a software routine calculates the loss event frequency. In some methods, the sixth step 560 is performed by using outputs generated by the map parameters module 360 and by the map findings module 370. The routine executed in the sixth step 560 also uses data from lookup tables, such as the loss event frequency by industry table 460. The software routine can be executed by using the calculate event frequency module 381 and can inputs the results of routines of step four 540 (e.g., vulnerability) and of step five 550 (threat event frequency). Any or all of the routines described in the various steps 510, 520, 530, 540, 550, 560 of the method of non-intrusive calculation of loss event frequency 500 can be performed with any of a variety of known computing processes.

Figure 6:
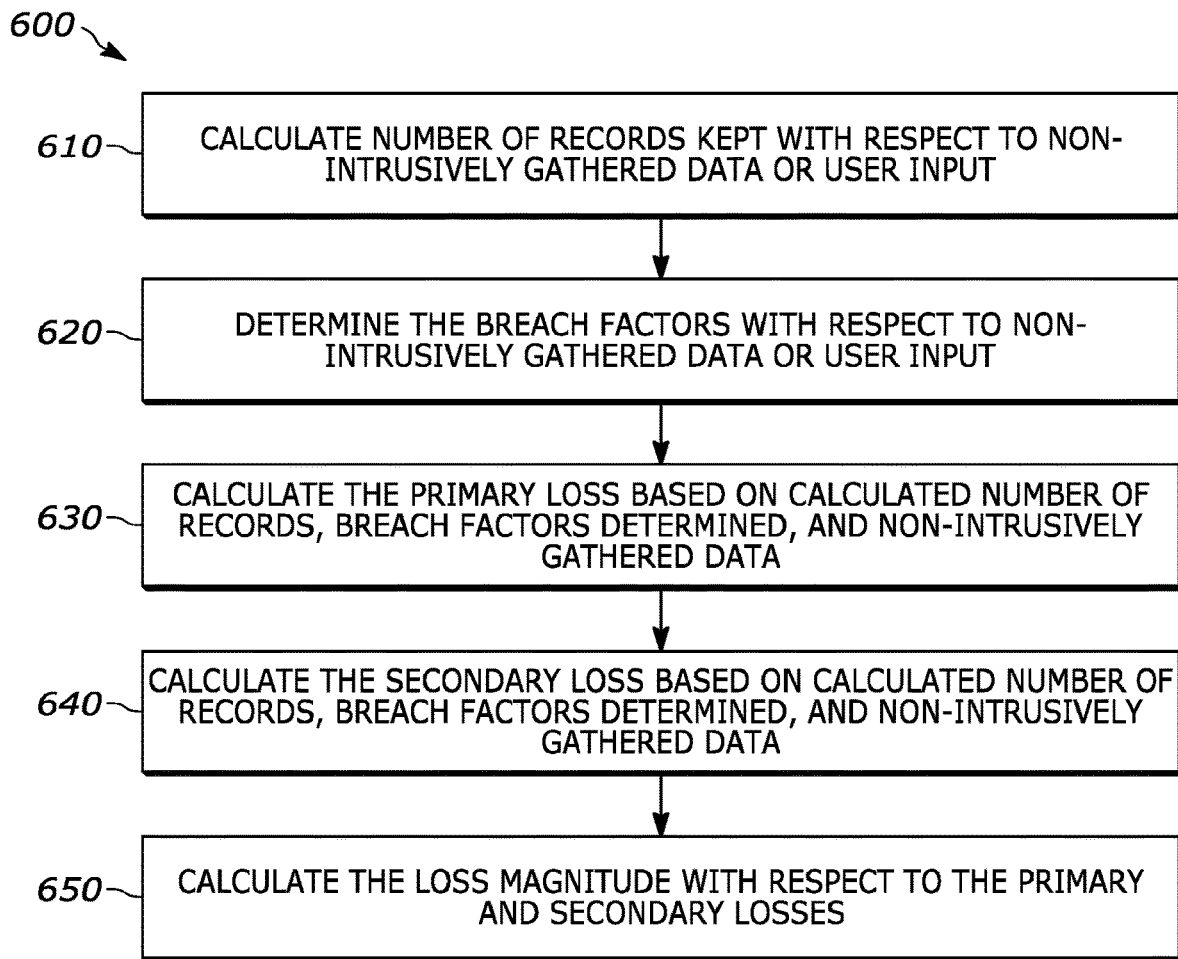
FIG. 6 illustrates a flow diagram of an embodiment of a method for statistical and non-intrusive calculation of loss magnitude according to the present teaching.

FIG. 6 illustrates a flow diagram of an embodiment of a method for statistical and non-intrusive calculation of loss magnitude 600 according to the present teaching. The method for statistical and non-intrusive calculation of loss magnitude 60 corresponds to a data breach. Referring to FIG. 1, FIG. 3, FIG. 4 and FIG. 6, routine calculates the number of average records from average records table 410 that are fetched by the fetch input parameters module 340. In some methods, the calculated number of records can also be altered by the user, so the routine can also take user input 390 into consideration.

In a second step 620 a software routine determines the breach factors from breach factors table 420 that can be fetched by the fetch input parameters module 340. In a third step 630 a software routine calculates the primary loss that represents the financial loss directly as a result of the cyber incident. The software routine of the third step 630 does the calculation based on the breach factor impact table 430 that can be fetched from fetch input parameters module 340. In some methods, the software routine used in the third step 630 also takes the user input 390 into consideration.

In a fourth step 640, a software routine calculates the secondary loss that represents the indirect costs due to a cyber incident. The secondary loss calculation can include, for example, customer churn, reputation loss, and/or regulatory fines. For example, the software routine used in the fourth step 640 can perform the calculation based on the breach factor impact table 430 that can be fetched from the fetch input parameters module 340. In some methods, the software routine used in the fourth step 640 take the user input 390 into consideration.

In a fifth step 650, a software routine calculates a loss magnitude. In some methods, the fifth step 650 uses the results of software routines executed in the third step 630 and/or the fourth step 640. In various embodiments, all or some of the routines in the first step 610, second step 620, third step 630, fourth step 640, and fifth 650 of the method 600 flow diagram are executed by the calculate loss module 382 in the cyber risk quantification engine 192. Any or all of the software routines described in the various steps 610, 620, 630, 640, 650 of the method for statistical and non-intrusive calculation of loss magnitude 600 can be performed with any of a variety of known computing processes.

Figure 7:
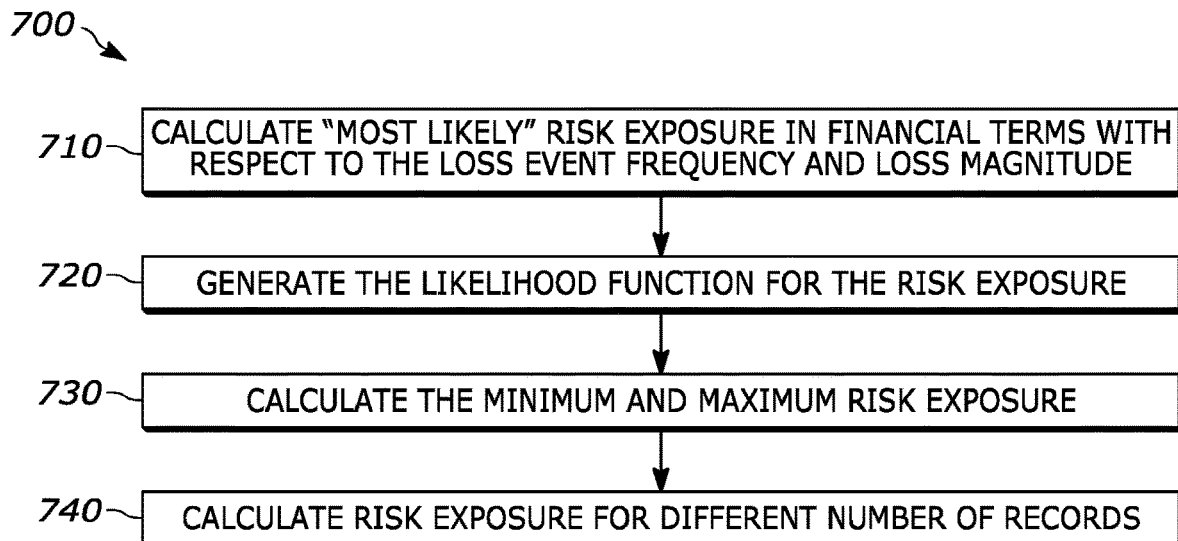
FIG. 7 illustrates a flow diagram of an embodiment of a method for calculating risk exposure according to the present teaching.

FIG. 7 illustrates a flow diagram of an embodiment of a method for calculating risk exposure 700 according to the present teaching. Referring to FIG. 3, FIG. 5 and FIG. 7, a first step 710 executes a routine that calculates the "most likely" risk exposure in financial terms. The calculation of most likely risk exposure is performed with respect to results of the loss event frequency generated in the sixth step 560 of the method of non-intrusive calculation of loss event frequency 500. The calculation of most likely risk exposure is performed with respect to results of the loss event frequency generated in the fifth step 650 of the method for statistical and non-intrusive calculation of loss magnitude 600.

In a second step 720, a routine generates the likelihood function for the risk exposure that gives the risk exposure in financial terms for a certain number of records. In a third step 730, the minimum and maximum risk exposure is calculated by using the likelihood function generated by the software routine executed in the second step 720. In a fourth step 740, a series of risk exposure results is calculated for the different numbers of records. Any or all of the first step 710, second step 720, third step 730, and fourth step 740 of the method for calculating risk exposure 700 can be executed by calculate risk module 383.

Figure 8:
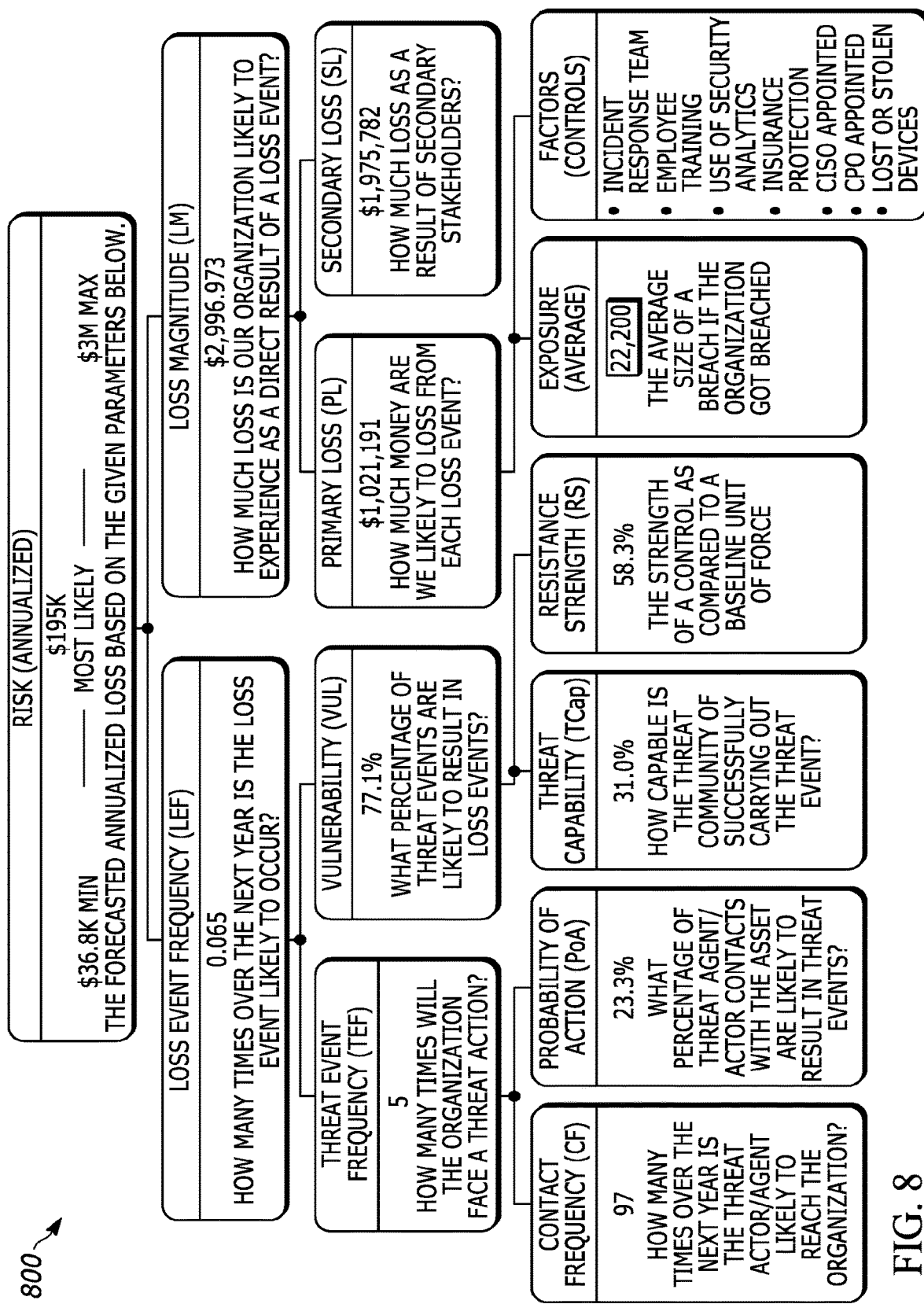
FIG. 8 illustrates an embodiment of a graphical user interface (GUI) presenting results for a single entity according to the present teaching.

FIG. 8 illustrates an embodiment of a graphical user interface (GUI) 800 presenting results for a single entity according to the present teaching. The GUI 800 is designed for customers to see all parameters taken into consideration while calculating the risk exposure in financial terms. The user can provide inputs from GUI 800 by clicking on any parameter.

FIG. 9 illustrates an embodiment of a graphical user interface (GUI) 900 presenting results for multiple entities in a tabular format according to the present teaching. One feature of the methods and systems of the present teaching is that the user can see multiple entities' risk exposure in financial terms in a single table where the results can be sorted.

Another feature of the methods and systems of the present teaching is that cyber risk exposure can be presented directly in financial terms by using non-intrusively gathered data. In particular, financial risk can be presented in terms of a probable financial impact in case of a data breach.

Yet another feature of the methods and systems of present teaching is that there is relatively little user input. Consequently, the methods and systems of present teaching scales well for cyber risk quantification of a large number of entities.

EQUIVALENTS

While the Applicant's teaching are described in conjunction with various embodiments, it is not intended that the applicant's teaching be limited to such embodiments. On the contrary, the Applicant's teaching encompass various alternatives, modifications, and equivalents, as will be appreciated by those of skill in the art, which may be made therein without departing from the spirit and scope of the teaching.

What is claimed is:

1. A method of cyber risk assessment, the method comprising:
   a) receiving a request for a quantitative cyber risk assessment of an entity associated with a domain name;
   b) discovering a digital footprint of the entity based on the domain name using non-intrusive information gathering;

c) determining an entity classification comprising a size and one of industry or country based on the digital footprint;
d) determining an entity technical finding comprising at least one of an asset vulnerability, a threat, a data loss, or a cyber event based on the discovered digital footprint;
e) computing a loss event frequency and a loss magnitude using the entity classification and the entity technical finding;
f) computing a probable financial impact of a cyber risk based on the loss event frequency and on the loss magnitude; and
g) providing recommendations for remediating the cyber risk based on the computed probable financial impact.

2. The method of cyber risk assessment of claim 1 wherein computing the loss event frequency comprises computing a level of difficulty a threat agent must overcome.

3. The method of cyber risk assessment of claim 1 wherein computing the loss event frequency comprises computing a probability of action for a threat agent.

4. The method of cyber risk assessment of claim 1 wherein computing the loss event frequency comprises computing a contact frequency of a threat agent.

5. The method of cyber risk assessment of claim 1 wherein computing the loss event frequency comprises computing an entity vulnerability parameter based on the entity classification.

6. The method of cyber risk assessment of claim 1 wherein computing the loss event frequency comprises computing a threat event frequency based on the entity technical findings and on the entity classification.

7. The method of cyber risk assessment of claim 1 wherein computing the loss magnitude comprises computing a financial loss resulting from the entity technical finding.

8. The method of cyber risk assessment of claim 1 wherein computing the loss magnitude comprises computing a secondary loss resulting from the entity technical finding.

9. The method of cyber risk assessment of claim 1 wherein the computing the probable financial impact of a cyber risk based on the loss event frequency and on the loss magnitude comprises calculating a minimum and a maximum risk exposure using a likelihood function.

10. The method of cyber risk assessment of claim 1 further comprising having a user initiate the request for the quantitative cyber risk assessment of the entity associated with the domain name.

11. The method of cyber risk assessment of claim 10 wherein the entity is the user's entity.

12. The method of cyber risk assessment of claim 10 wherein the entity is not the user's entity.

13. The method of cyber risk assessment of claim 1 further comprising presenting the probable financial impact with a graphical user interface.

14. The method of cyber risk assessment of claim 1 further comprising validating the request for the quantitative cyber risk assessment.

15. The method of cyber risk assessment of claim 1 further comprising prioritizing third parties with respect to at least one of the loss event frequency and the loss magnitude.

16. The method of cyber risk assessment of claim 1 further comprising providing off- or on-site audits.

17. A system of cyber risk assessment, the system comprising:
a) a first hardware processor coupled to a network that receives a request for a quantitative cyber risk assessment of an entity associated with a domain name and that discovers a digital footprint of the entity based on the domain name using non-intrusive information gathering;
b) a second hardware processor in communication with the first hardware processor that determines an entity classification comprising a size and one of industry or country based on the digital footprint, determines an entity technical finding comprising at least one of an asset vulnerability, a threat, a data loss, or a cyber event based on the discovered digital footprint; computes a loss event frequency and a loss magnitude using the entity classification and the entity technical finding; and computes a probable financial impact based on the loss event frequency and the loss magnitude; and
c) a third hardware processor in communication with the second hardware processor that provides recommendations for remediating the risks based on the computed probably financial impact.

18. The system of cyber risk assessment of claim 17 wherein at least two of the first, second, and third hardware processor comprise the same hardware processor.

19. The system of cyber risk assessment of claim 17 wherein at least one of the first, second, and third hardware processor comprise an engine.

20. The system of cyber risk assessment of claim 19 wherein the engine comprises at least one of software, a CPU, a memory, and input/output device, and a communication adapter.

* * * * *